United States Patent
Ranzinger et al.

(10) Patent No.: US 10,783,398 B1
(45) Date of Patent: Sep. 22, 2020

(54) IMAGE EDITOR INCLUDING LOCALIZED EDITING BASED ON GENERATIVE ADVERSARIAL NETWORKS

(71) Applicant: SHUTTERSTOCK, INC., New York, NY (US)

(72) Inventors: Michael Steven Ranzinger, Boulder, CO (US); Nicholas Alexander Lineback, Denver, CO (US)

(73) Assignee: Shutterstock, Inc., New York, NY (US)

( * ) Notice: Subject to any disclaimer, the term of this patent is extended or adjusted under 35 U.S.C. 154(b) by 130 days.

(21) Appl. No.: 16/166,641

(22) Filed: Oct. 22, 2018

(51) Int. Cl.
| | |
|---|---|
| *G06K 9/62* | (2006.01) |
| *G06T 11/60* | (2006.01) |
| *G06F 16/51* | (2019.01) |
| *G06F 16/54* | (2019.01) |
| *G06F 16/56* | (2019.01) |
| *G06F 16/583* | (2019.01) |
| *G06F 16/9535* | (2019.01) |

(52) U.S. Cl.
CPC ........... *G06K 9/6215* (2013.01); *G06F 16/51* (2019.01); *G06F 16/54* (2019.01); *G06F 16/56* (2019.01); *G06F 16/5838* (2019.01); *G06F 16/9535* (2019.01); *G06K 9/6256* (2013.01); *G06K 9/6277* (2013.01); *G06T 11/60* (2013.01); *G06T 2200/24* (2013.01)

(58) Field of Classification Search
None
See application file for complete search history.

(56) References Cited

U.S. PATENT DOCUMENTS

| | | | |
|---|---|---|---|
| 2016/0098844 A1* | 4/2016 | Shaji | G06K 9/6273 382/156 |
| 2016/0267339 A1* | 9/2016 | Nakano | G06K 9/00228 |
| 2017/0228615 A1* | 8/2017 | Chavez | G06K 9/6215 |
| 2018/0247107 A1* | 8/2018 | Murthy | G06T 7/0012 |
| 2018/0374249 A1* | 12/2018 | Colbert | G06K 9/4628 |
| 2019/0251612 A1* | 8/2019 | Fang | G06N 3/08 |

* cited by examiner

*Primary Examiner* — Sean M Conner
(74) *Attorney, Agent, or Firm* — McDermott Will & Emery LLP

(57) ABSTRACT

A method for receiving an image query from a user via a client device is provided. The method includes determining a user personalized data based on a prior user history, generating a synthetic image with a generative tool, based on the image query and the user personalized data, and evaluating a similarity between the synthetic image and a real image in an image database with a discriminative tool. The method also includes providing the synthetic image to the user for selection and storing a user response to the synthetic image in the prior user history. A system and a non-transitory, computer readable medium storing instructions to cause the system to perform the above method are also disclosed.

17 Claims, 9 Drawing Sheets

IMAGE EDITOR INCLUDING LOCALIZED EDITING BASED ON GENERATIVE ADVERSARIAL NETWORKS

BACKGROUND

Field

The present disclosure generally relates to image editors configured to provide dynamic images personalized according to personalized user information, upon a user request. More specifically, the present disclosure relates to image editors including tools that create and modify images from an image database according to personalized user information, such as user location and common preferences in the user location.

Description of the Related Art

Image editing platforms that include search engines associated with a multimedia database commonly are blind to personalized user information (e.g., the designer or the person downloading the image), such as locality and the like. For example, an advertising campaign may include enticing images and text conveniently chosen by the content creator (e.g., "user") with a specific market segment in mind. However, it is well known that the same advertising feature (e.g., image, video clip, sound bite, and the like) will have different rate of success in different geographic locations, languages, and age groups which eventually lead to incorrect matchings, increased expenses, and time consumed for the campaign (e.g., recruiting local "curators" for different countries or regions).

SUMMARY

In one embodiment of the present disclosure, a computer-implemented method is described that includes receiving an image query from a user via a client device and determining a user personalized data based on a prior user history. The computer-implemented method includes generating a synthetic image with a generative tool, based on the image query and the user personalized data and evaluating a similarity between the synthetic image and a real image in an image database with a discriminative tool. The computer-implemented method also includes providing the synthetic image to the user for selection and storing a user response to the synthetic image in the prior user history.

According to one embodiment, a system is described that includes at least one processor and a memory coupled to one or more processors, the memory including instructions that, when executed by the at least one processor, cause the at least one processor to receive an image query from a user via a client device and to determine a user personalized data based on a prior user history. The one or more processors are also configured to execute instructions to generate a synthetic image with a generative tool, based on the image query and the user personalized data, and to evaluate a similarity between the synthetic image and a real image in an image database with a discriminative tool. The one or more processors are also configured to provide the synthetic image to the user for selection, and to store a user response to the synthetic image in the prior user history.

According to one embodiment, a non-transitory, machine readable medium is described that includes instructions, which when executed by one or more processors, cause a computer to perform a method for receiving an image query from a user via a client device. The method includes determining a user personalized data based on a prior user history, generating a synthetic image with a generative tool, based on the image query and the user personalized data, and evaluating a similarity between the synthetic image and a real image in an image database with a discriminative tool. The method also includes providing the synthetic image to the user for selection, and storing a user response to the synthetic image in the prior user history.

In yet other embodiment, a system is described that includes a means for storing commands and a means for executing the commands causing the system to perform a method including receiving an image query from a user via a client device. The method includes determining a user personalized data based on a prior user history, generating a synthetic image with a generative tool, based on the image query and the user personalized data, and evaluating a similarity between the synthetic image and a real image in an image database with a discriminative tool. The method also includes providing the synthetic image to the user for selection, and storing a user response to the synthetic image in the prior user history.

In a further embodiment, a computer-implemented method is described that includes providing an input query for an image in a design template supported by an application on a client device. The computer-implemented method includes providing at least one geographic location for tailoring a synthetic image in the design template, selecting a degree of resemblance between the synthetic image and a real image, and selecting an image from a results panel displayed on a user interface of the application in a display of the client device.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

In the figures, elements and steps denoted by the same or similar reference numerals are associated with the same or similar elements and steps, unless indicated otherwise.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

General Overview

As used herein, the term "content item" may be used, for example, in reference to a digital file that is composed of one or more media elements of different types (text, image, video, audio, etc.). A content item can be a single picture or a single video file. The term "image identifier" as used herein may refer to a form of metadata such as a tag and a label, or a caption associated with an image for identifying the image.

Embodiments as disclosed herein provide "responsive" images to a user creating a media file with a design template that has access to an image search engine, based on conditions of consumer who loads the image (locale, language, browser). For example, a consumer of images in Japan may be attracted to images of tigers having a certain combination of colors and patterns in the tiger skin, or even in the fine details of the animal's features, based on the habits and uses of Japanese arts and crafts. Accordingly, when such consumer searches for images or looks at advertising campaigns containing such images he/she may be more likely to consume the image (e.g., download the picture, or react positively to the advertisement campaign). Thus, embodiments as disclosed herein provide solutions to the problem arising in computational image editing of creating personalized images based on locality and other user characteristics. The personalized images are realistic and provided automatically, with reduced user input and yet highly likely to be downloaded by the user.

The proposed solution further provides improvements to the functioning of the computer itself because it saves computer-processing time (e.g., replacing lengthy image search routines over extensive databases by a rapidly converging generative adversarial tool).

Although many examples provided herein describe user's search inputs being identifiable, or download history for images being stored, each user may grant explicit permission for such user information to be shared or stored. The explicit permission may be granted using privacy controls integrated into the disclosed system. Each user may be provided notice that such user information will be shared with explicit consent, and each user may at any time end having the information shared, and may delete any stored user information. The stored user information may be encrypted to protect user security.

Example System Architecture

Figure 1:
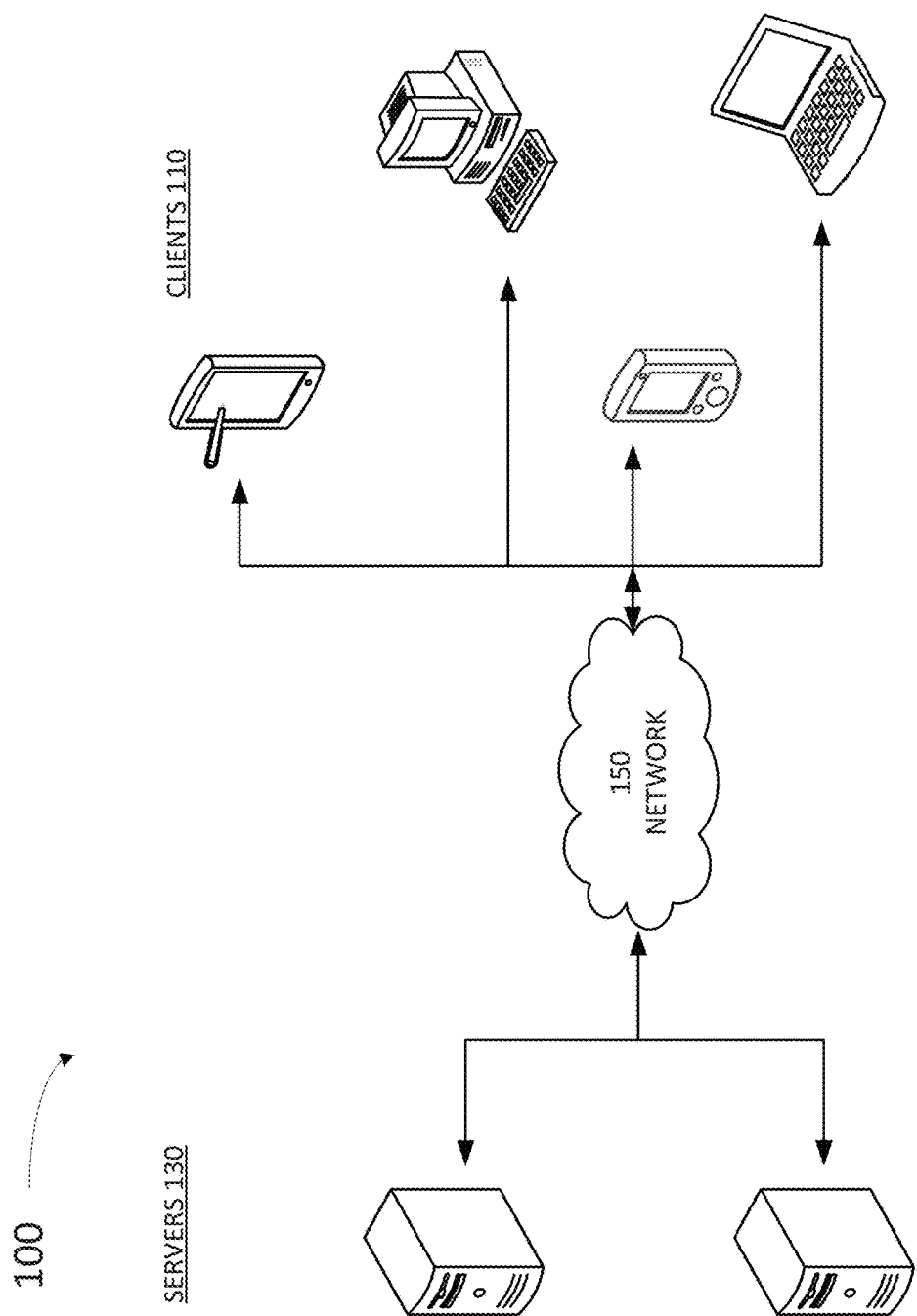
FIG. 1 illustrates an example architecture suitable for creating an image based on a user query, according to some embodiments.

FIG. 1 illustrates an example architecture 100 for creating an image based on a user query, suitable for practicing some implementations of the disclosure. The architecture 100 includes servers 130 and clients 110 connected over a network 150. One of the many servers 130 is configured to host a memory including instructions which, when executed by a processor, cause the server 130 to perform at least some of the steps in methods as disclosed herein. In some embodiments, the processor is configured to search and find multimedia data files including images, video, music, and the like using text queries input by a user through client device 110. Further, in some embodiments, the processor in server 130 is configured to create synthetic images, and to determine how realistic the synthetic images are, before presenting to the user. Accordingly, one of the many servers 130 also hosts a collection of images, videos, and multimedia files. The collection of multimedia files can be searched using an image search engine (e.g., accessible through a web page or an application running on one of clients 110). Servers 130 can return synthetic images to clients 110, in response to the input user query. Moreover, in some embodiments, the processor is configured to associate the synthetic image with a user locale, so that the user is more likely to download the image. For purposes of load balancing, multiple servers 130 can host memories including instructions to one or more processors and multiple servers 130 can host the collection of images.

Servers 130 may include any device having an appropriate processor, memory, and communications capability for hosting the collection of images and the image search engine. The image search engine is accessible by various clients 110 over the network 150. Clients 110 can be, for example, desktop computers, mobile computers, tablet computers (e.g., including e-book readers), mobile devices (e.g., a smartphone or PDA), or any other devices having appropriate processor, memory, and communications capabilities for accessing the image search engine on one of servers 130. Network 150 can include, for example, any one or more of a local area network (LAN), a wide area network (WAN), the Internet, and the like. Further, network 150 can include, but is not limited to, any one or more of the following network topologies, including a bus network, a star network, a ring network, a mesh network, a star-bus network, tree or hierarchical network, and the like.

Example Automatic System

Figure 2:
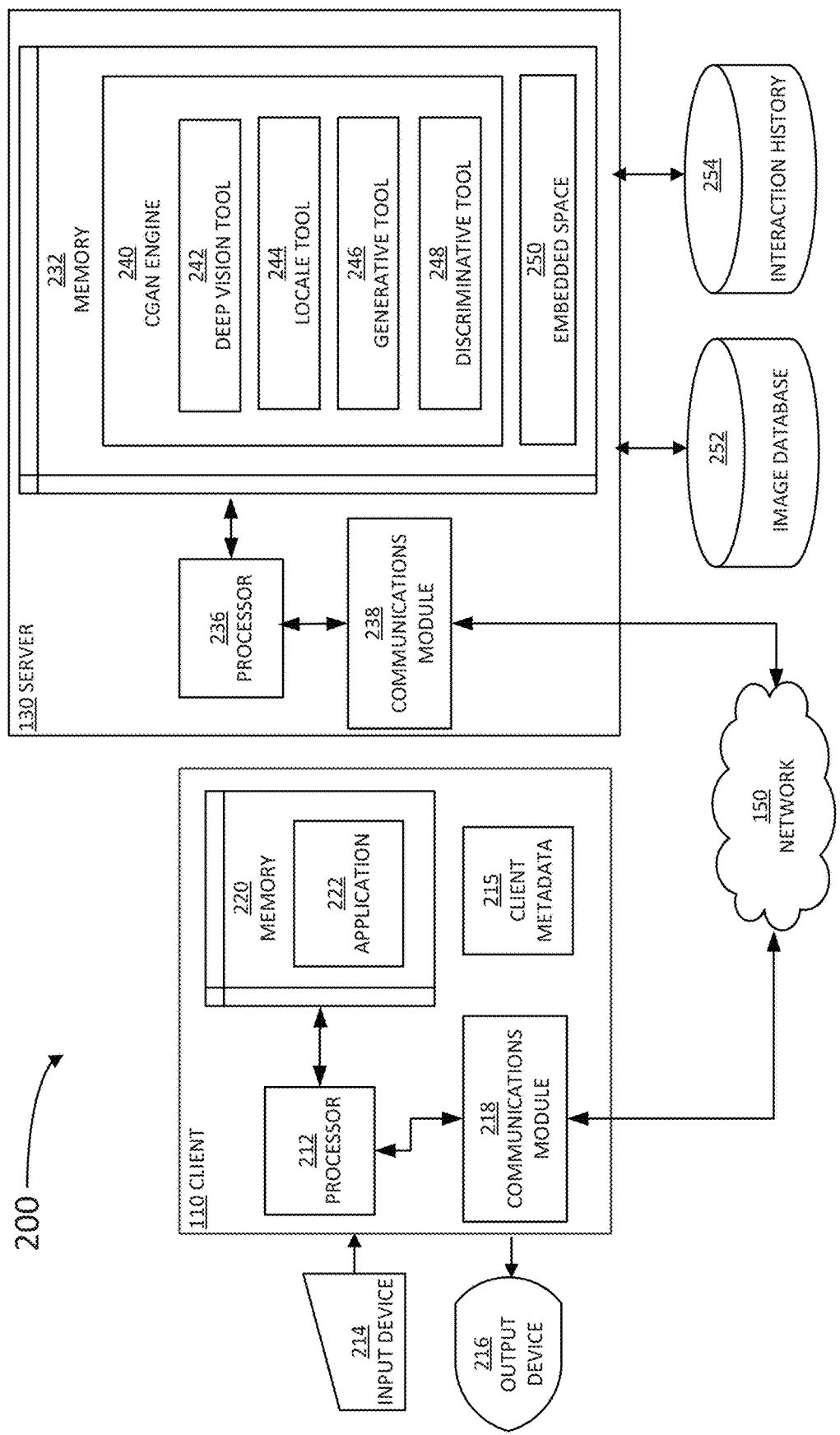
FIG. 2 is a block diagram illustrating an example server and client from the architecture of FIG. 1, according to certain aspects of the disclosure.

FIG. 2 is a block diagram 200 illustrating an example server 130 and client 110 in the architecture 100 of FIG. 1, according to certain aspects of the disclosure. Client 110 and server 130 are communicatively coupled over network 150 via respective communications modules 218 and 238. Communications modules 218 and 238 are configured to interface with network 150 to send and receive information, such as data, requests, responses, and commands to other devices on the network. Communications modules 218 and 238 can be, for example, modems or Ethernet cards.

Memory 232 includes a deep vision tool 242 for searching image database 252. In one or more implementations, image database 252 represents a database that contains, for each image, a mapping from an image identifier to a data file containing pixel data for the image (e.g., in jpeg format).

Server 130 includes a memory 232, a processor 236, and communications module 238. Moreover, in some embodiments, processor 236 is configured to receive input queries from a user, to retrieve a desired image from image database 252, or from a synthetic image, through a user interface for a CGAN engine 240, in an application 222. The user interface is displayed for the user in an output device 216 of client 110. In some aspects, processor 236 executes instructions from memory 232, to provide a synthetic image to the user on display at output device 216, as desired.

The user may access CGAN engine 240 through application 222 or a web browser installed in client 110. Execution of application 222 may be controlled by a processor 212 in client 110. Image database 252 can be, for example, a dataset associated with images corresponding to a number of style classes (e.g., about 25 or more). The images may be paired with image vector information and image cluster information. The image vector information identifies vectors representing a large sample of images (e.g., about 50 million or more) and the image cluster information identifies the vectors in one or more clusters such that each of the cluster of images represents a semantic concept.

In some embodiments, image database 252 and CGAN engine 240 may be in the same memory 232 of a server 130. In certain aspects, the image database 252 and CGAN engine 240 can be hosted in a memory of a different server but accessible by server 130 illustrated in FIG. 2. In some embodiments, CGAN engine 240 is configured to execute commands and instructions from a locale tool 244. Locale tool 244 may include a neural network (NN), such as a language NN (LNN), a deep NN (DNN), or a convolutional NN (CNN).

An interaction history data 254 stores prior user interactions with image database 252 and with server 130 (e.g., images downloaded, uploaded, and/or viewed, input queries entered, and the like). In certain aspects, processor 236 is configured to determine the interaction history data 254 by obtaining user interaction data identifying interactions with images from image search results that are responsive to input user queries. For example, the processor 236 may determine that a user interacted with an image from a search result, such as by clicking on the image, saving the image for subsequent access, or downloading the image to a client (e.g., client 110), or the like. The processor 236 may keep track of the user interactions with a number of images over a given time period. The interaction history 254 may also include data indicating search behavior (and/or patterns) relating to prior image search queries.

Processor 236 is configured to execute instructions, such as instructions physically coded into processor 236, instructions received from software in memory 232, or a combination of both. A user of client 110 may use input device 214 to submit a search term or phrase via a user interface of application 222. The user interface may include an input section where the search term or phrase may be typed in, for example. The input section may include one or more controls to allow the user to initiate the image search upon receiving the search query. In some aspects, the image query may be initiated automatically upon receiving at least one search term (or at least the search phrase in part).

A search query is then provisioned to deep vision tool 242 for initiating the image search through image database 252. The search query may be provided, for example, by the user accessing deep vision tool 242 over network 150 using application 222 in memory 220 on client 110. The user submits the input user query using input device 214 of client 110. For example, the user may use input device 214 to enter a text-based search term or phrase. In response to the IUQ, a processor in client 110 transmits the search query over the network 150 using communications module 218 of client 110 to communications module 238 of server 130.

Processor 236, upon receiving the IUQ, submits a search request to CGAN engine 240. In some embodiments, processor 236 receives an identification of a plurality of images from image database 252 that are responsive to the input user query. The plurality of images from image database 252 may be sorted according to an image score (e.g., using interaction history database 254) indicating a probability of a user interaction for each image (e.g., the probability of a user clicking a thumbnail associated with one of the images). Processor 236 may then provide the listing of images to application 222 over network 150 for display by output device 216. The listing of images may include a plurality of thumbnails in a results panel of the user interface in output device 216.

In some embodiments, CGAN engine 240 generates a synthetic image using real images stored in image database 252, and a deep vision tool 242, a locale tool 244, a generative tool 246, and a discriminative tool 248, in a generative, adversarial configuration. In some embodiments, the generative adversarial configuration includes generative tool 246 modifying images selected from image database 252 (using an embedded space 250) to generate synthetic images. Embedded space 250 may be generated and constantly updated by deep vision tool 242. The synthetic images are processed by discriminative tool 248 to determine whether the synthetic image satisfies the input user query, and whether the synthetic image is realistic. Locale tool 244 provides a locale to condition the generative adversarial network to produce synthetic images that are likely to be selected by users from a certain region, country, or geographical denomination. In some embodiments, locale tool 244 uses client metadata 215 to determine locale information, or a direct user input, or may retrieve or infer the locale information from interaction history 254.

Figure 3:
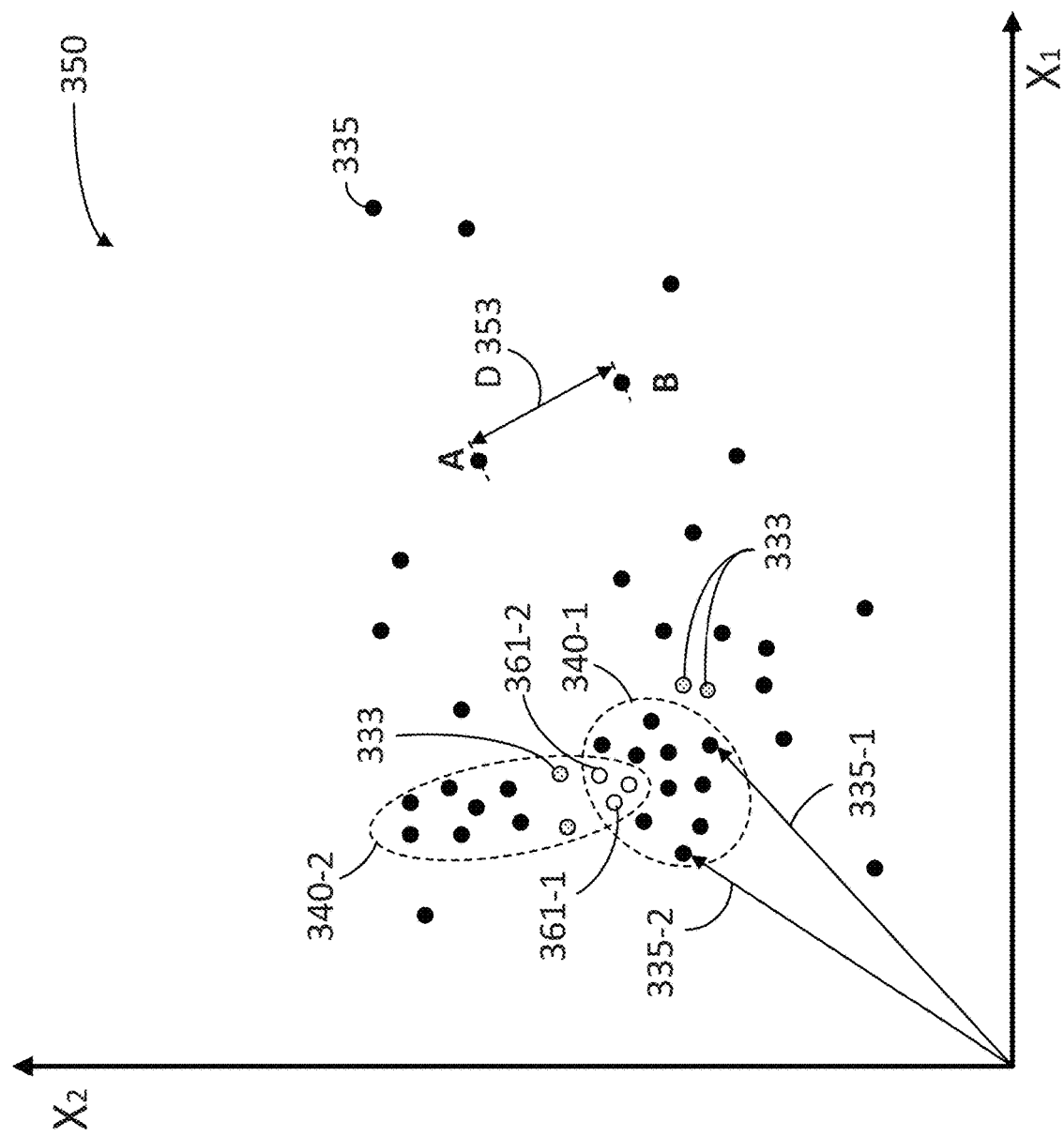
FIG. 3 illustrates an embedded space with image vectors for creating images in a canvas using generative adversarial networks, according to some embodiments.

FIG. 3 illustrates an embedded space 350 with image vectors 335-1 and 335-2 (hereinafter, collectively referred to as "image vectors 335") for creating images in a canvas using generative adversarial networks, according to some embodiments. For illustrative purposes, only the projection of embedded space 350 on two dimensions, $X_1$, in the abscissae, and $X_2$, in the ordinates, are illustrated. Image vectors 335 are associated with specific images stored in an image database (e.g., image database 252).

Embedded space 350 may be formed by deep vision tool 242 using image database 252. Further, embedded space 350 may be stored in memory 232 (e.g., embedded space 250), or may be external to memory 232 and directly or remotely accessible to CGAN engine 240 (e.g., image database 252). The values for $X_1$ and $X_2$, for each of image vectors 335, may also include a locale information about the images, selected according to locale tool 244. In some embodiments, deep vision tool 242 is configured so that image vectors 335 associated with visually similar images are located, or "clustered," in close proximity to each other in embedded space 350, wherein a distance, D 353, between any two image vectors 335 ('A,' and 'B') may be defined as a "cosine" distance, D. In some embodiments, and without limitation, a cosine distance between two vectors, A, and B, regardless of the dimensions of the vectors, may be obtained from the mathematical expression $$D = 1 - \frac{A \cdot B}{|A||B|},\qquad(1)$$

where the "dot" product "·" may be suitably defined for the vector space that includes vectors A and B, and |A| and |B|, are generally "lengths" associated to vectors A and B, respectively, in the vector space.

Therefore, it is expected that image vectors within a cluster 340-1 or a cluster 340-2 (hereinafter, collectively referred to as "clusters 340") are visually similar to one another. Moreover, the closer the cosine distance D 353, the more visual similarity between two image vectors 335 is expected. In some embodiments, cluster 340-1 may be associated with users having certain characteristics in common (e.g., locale of residence). More specifically, in some embodiments, cluster 340-1 may be associated with image styles commonly preferred by users from a certain locale (e.g., country, region, continent, and the like). In some aspects, cluster 340-2 may include images having a certain thematic subject (e.g., "tigers," "sports cars," and the like). The intersection between clusters 340-1 and 340-2 then contains images of a certain style that are of the liking, or preferences, of a specific locale (e.g., a Japanese tiger, or a picture of a tiger in Japanese style, or a picture of a tiger that is highly likely to be downloaded by a user in Japan). In some embodiments, a deep vision model may be trained to carefully select cluster 340-1 by picking background images corresponding to images generating a random response from users of the locale corresponding to cluster 340-1. For example, images 333 inside cluster 340-2 may be associated to pictures of tigers that are NOT selected by Japanese users (or having a probability of being picked by a Japanese user of less than 50%).

Accordingly, embodiments as disclosed herein provide images to a user based on a user query for a subject or theme (e.g., from cluster 340-2), but which also are associated with the user locale (e.g., in cluster 340-1), so that the user is highly likely to download, purchase, or be satisfied with the search result. Thus, in some embodiments, a CGAN engine retrieves images from the database belonging to the intersection between clusters 340-1 and 340-2. Moreover, in some embodiments, the CGAN engine is trained to create a synthetic image 361-1 or 361-2 (hereinafter, collectively referred to as "synthetic images 361") that belongs in the intersection of clusters 340. For example, in some configurations, CGAN engine may not find an image in the image database that belongs to the intersection of clusters 340. In such scenario, the CGAN engine may be configured to create a synthetic image that belongs in the intersection of clusters 340. Additionally, in some embodiments, the CGAN is trained such that synthetic images 361 are 'realistic' (e.g., indistinguishable from other images retrieved from the image database).

Figure 4:
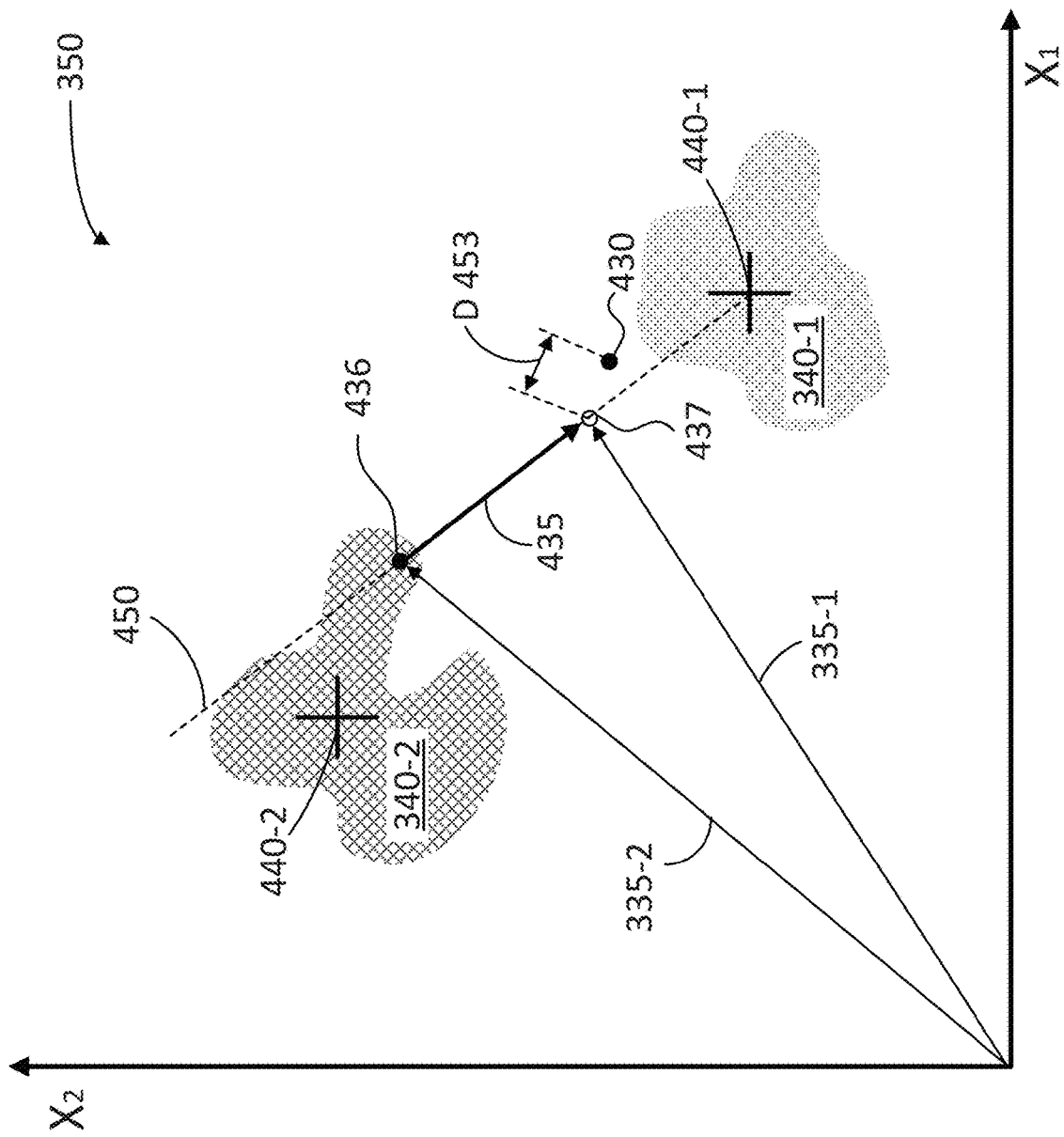
FIG. 4 illustrates an embedded space with image vectors for creating a synthetic image using generative adversarial networks, according to some embodiments.

FIG. 4 illustrates an embedded space 350 with image vectors 335-1 and 335-2, for creating a synthetic image 437 using GAN tools (e.g., CGAN and the like), according to some embodiments. Coordinates $X_1$ and $X_2$ are as defined in FIG. 3 above. A CGAN engine as disclosed herein generates synthetic image 437 based on an input query by a user from a locale associated with a cluster 340-1 (e.g., Japan). The input query for the user may be directed to a theme, subject, or classification associated with a cluster 340-2, in embedded space 350 (e.g., "tiger"). Clusters 340 may have centroids 440-1 and 440-2, respectively (hereinafter, collectively referred to as "centroids 440"). Centroids 440 may be associated with true images from the database, in some embodiments. In some embodiments, centroids 440 may indicate points in embedded space 350.

Given the input user query (e.g., "tiger"), and the fact that the user is in Japan, a CGAN engine as disclosed herein may look within the image database for an image in the intersections of clusters 340. If the intersection between clusters 340 is empty in the image database, the CGAN generates synthetic image 437 by modifying an image 436 in cluster 340-2 along a line 450 joining centroids 440 (cf. incremental vector 435). Accordingly, the CGAN engine modifies certain style characteristics of image 436 until an image vector 437 for the synthetic image is close to centroid 440-1 (e.g., within the boundaries of cluster 340-1), and also sufficiently close (as measured by a distance D 453) to an image vector 430 corresponding to an image from the image database.

Figure 5:
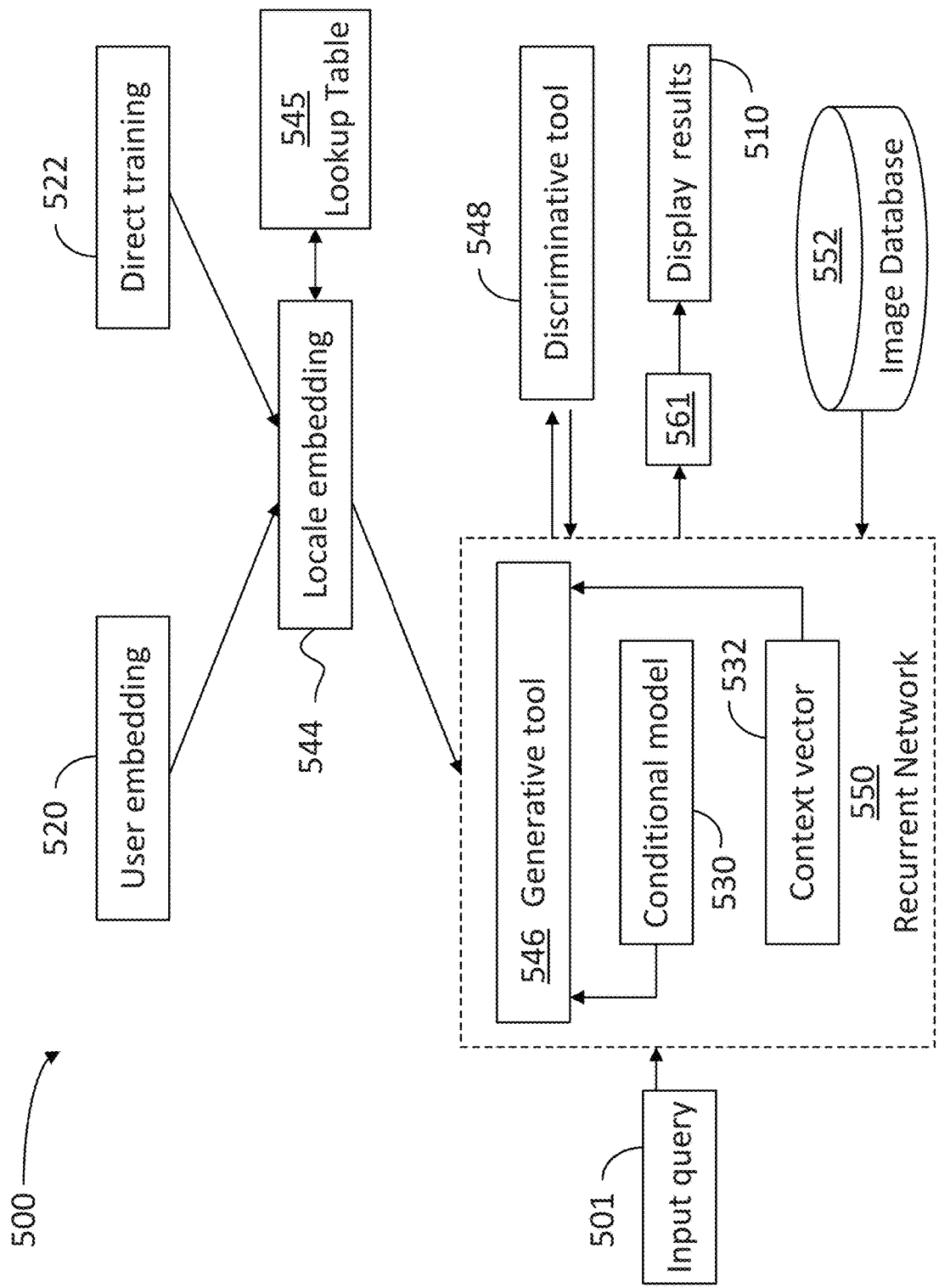
FIG. 5 illustrates a block diagram for training and using a tool in an image editor, according to some embodiments.

FIG. 5 illustrates a block diagram 500 for training and using a tool in an image editor, according to some embodiments. A locale embedding 544 may include a network trained to produce image vectors in an embedded space (e.g., in embedded space 350), wherein at least one of the coordinates (e.g., $X_1$ or $X_2$) represent locale information for a given image. In some embodiments, locale embedding 544 may receive a direct training 522 using, for example, an input tab for the user in an application template (e.g., application 222). Thus, the user may directly enter locale information together with an image query, and the locale information entered by the user is incorporated in the embedded space directly, by locale embedding 544. In some aspects, locale embedding 544 is a network trained to predict the probability that a given image is downloaded from a given set of locales using a general image recognition model to convert an image into a context vector. Accordingly, in some embodiments, the feature vectors from the final layer in the image recognition model (e.g., a neural network) are inspected for direct locale information (e.g., provided by the users that upload the image into image database 552, or that request or query for the image from image database 552).

In some embodiments, a user embedding 520 may generate several coordinates in the embedded space, some of which may include, or may be related to, locale embedding 544. In such embodiments, user embedding 520 is a network trained to predict an image(s) that a user is likely to be interested in, or download, based on an input query 501. User embedding 520 may include a set of preferences for each of multiple users modeled according to an interaction history (e.g., interaction history 254). In some embodiments, locale embedding 544 is configured to look for features provided by user embedding 520, and that encode locale features, which are then embedded into the locale space.

In some embodiments, locale embedding 544 may further cluster images according to the coordinates provided by user embedding 520, mining for natural clusters that represent the locale that users are located in. In some embodiments, a multi-modal network determines a user locale. The multi-modal network may include training from, in one aspect, locale embedding 544, and in a second aspect, user embedding 520. The multi-modal network may be configured to predict whether a user is from a pre-selected locale (e.g., based on user embedding 520). In some embodiments, locale embedding 544 may create a lookup table 545 including multiple users. Lookup table 545 may include a K-dimensional feature vector for each user in the list.

A recurrent network 550 that uses a generative tool 546 (e.g., generative tool 246) to create a synthetic image 561 from input query 501. A conditional model 530 may be configured to condition generative tool 546 based on the user embedding being predicted (e.g., using the K-dimensional vector from lookup table 545). Accordingly, it is desirable that synthetic image 561 captures the target locale aesthetics (enhancing the likelihood of being downloaded). A context vector 532 may provide insight to generative tool 546 into the user history (e.g., interaction history 254). The interaction history may include the entire set of downloads for this user, or more granularly by a current session. In some embodiments, context vector block 532 may convert context images selected from input query 501 into a representation suitable for the user-embedding-network. In some embodiments, context vector block 532 may include a deep learning tool trained on images from image database 552. Context vector block 532 then extracts the feature vectors produced by the deep learning tool to use as the context for generative tool 546. Recurrent network 550 is also configured to predict whether synthetic image 561 is relevant to the user (e.g., compared to the 'normal' user interest, as defined by context vector block 532) as a binary classifier. For this, in some embodiments, recurrent network 550 feeds K−1 context vectors, and predicts a K-th context vector. As feedback compensation, recurrent network 550 is trained sampling negative examples, e.g., images that are unlikely to be interesting to the user. In some embodiments, feedback training of recurrent network 550 may include randomly sampling the rest of the training set (e.g., from image database 252). A discriminative tool 548 is configured to predict how realistic is synthetic image 561, and to predict whether or not the image is suitable for a given locale (using locale embedding 544).

In some embodiments, generative tool 546 and discriminative tool 548 may be trained in a Conditional GAN (CGAN) configuration. A CGAN configuration conditions generative tool 546 and discriminative tool 548 using target locale embedding provided by direct training 522. In some embodiments, generative tool 546 and discriminative tool 548 may be trained in an Informational GAN (InfoGAN) configuration. An InfoGAN configuration supplies an additional context vector to generative tool 546 and to discriminative tool 548. Accordingly, in addition to being sufficiently realistic according to discriminative tool 548, InfoGAN ensures that synthetic image 561 includes context vector components associated to locale information (as measured by information theory entropy).

In some embodiments, recurrent network 550 may also include a "Query Language Model" that produces embedding of a text string in input query 501. Depending on the granularity of the trained user model from locale embedding 544, some embodiments may retrieve user intent from user embedding 520 rather than waiting for input query 501.

Figure 6:
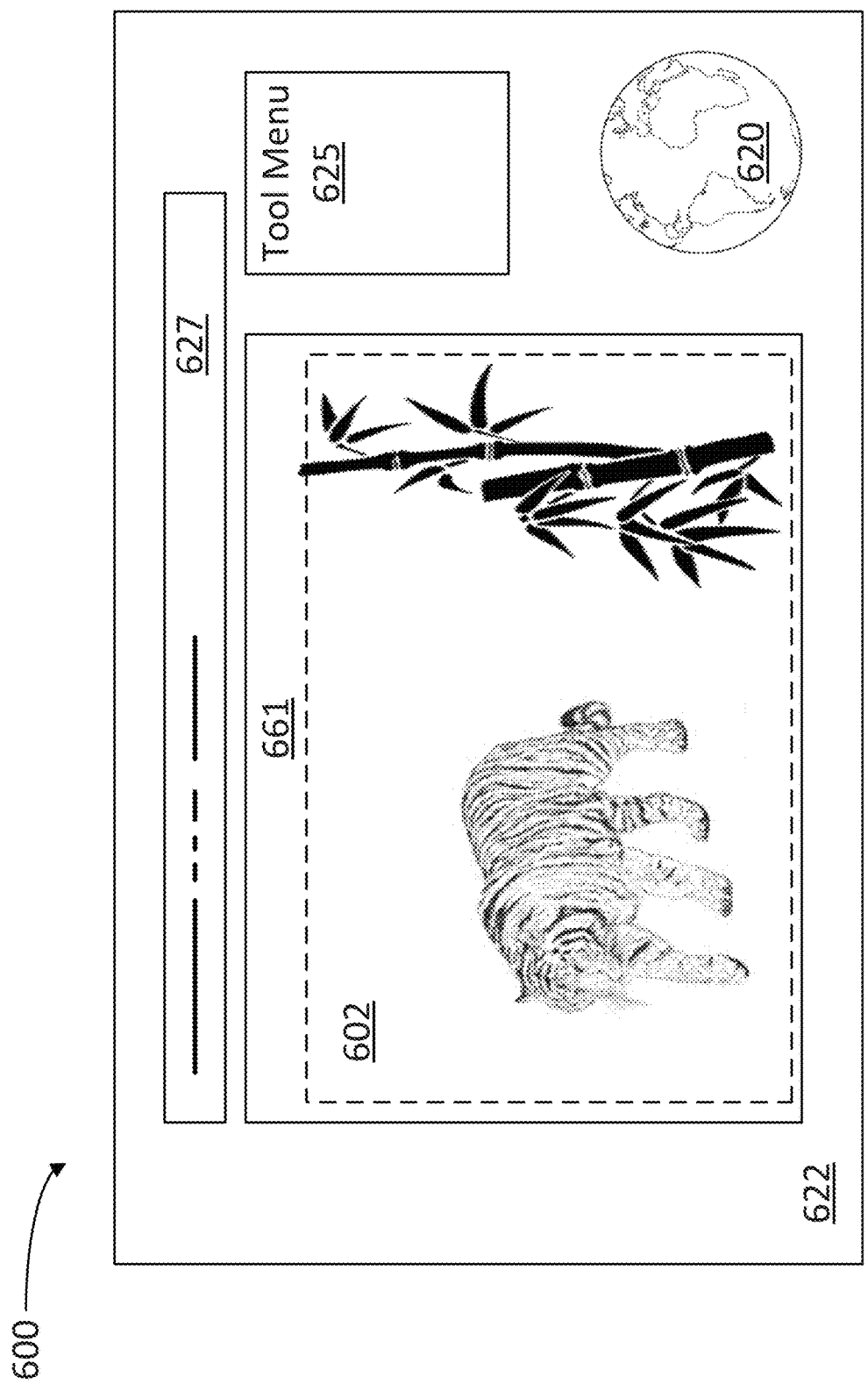
FIG. 6 illustrates a screen shot of a web page of an image editor configured for tailoring a synthetic image to a locale with a generative adversarial network, according to some embodiments.

FIG. 6 illustrates a screen shot of a web page of an image editor 600 configured for tailoring a synthetic image 661 to a locale with a CGAN engine (cf. CGAN engine 240), according to some embodiments. Image editor 600 includes a search query 627, a locale selector 620, and a tool menu 625 in a panel 622 provided to the display or output device of a client device controlled by the user (e.g., client device 110 and output device 216). Tool menu 625 is provided to the user to manually edit synthetic image 610, or use synthetic image 610 in a canvas composition. In some embodiments, the user may actively indicate in locale selector 620 a geographic location where the user may desire to target or implement synthetic image 661. In some embodiments, the CGAN engine may automatically detect or determine a locale for the user.

Synthetic image 661 may also include a background image 602, selected according to embodiments disclosed herein. For example, in some embodiments, background image 602 may be manually selected by the user, or automatically selected by the CGAN engine. For example, in the case where the user is in Japan and requests pictures of a tiger, the CGAN image may generate also a background image 602 including a bamboo tree (highly appreciated in Japan, and a realistic combination with a tiger).

Figure 7:
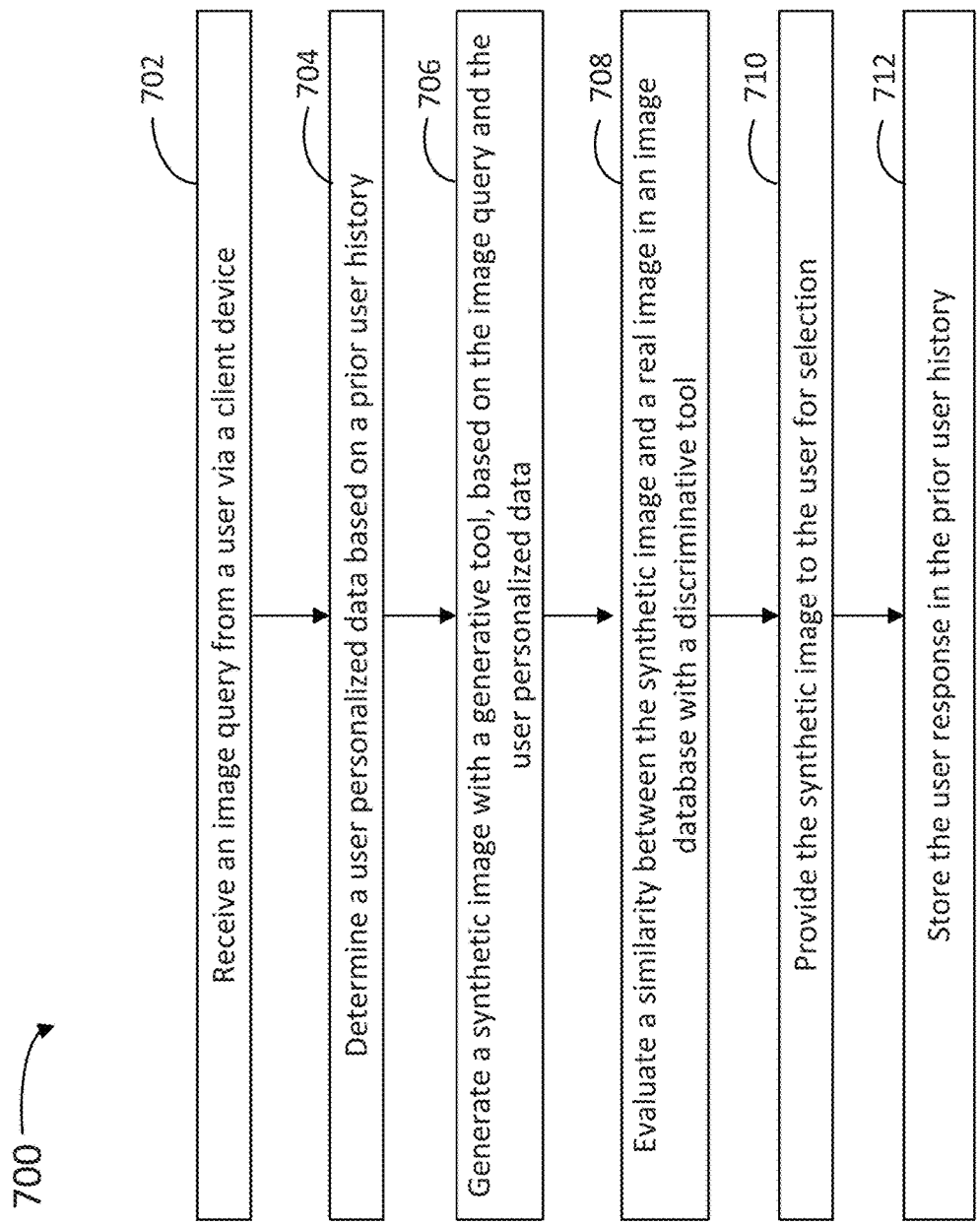
FIG. 7 is a flow chart illustrating steps in a method to create an image tailored according to a personalized information, according to some embodiments.

FIG. 7 is a flow chart illustrating steps in a method 700 to provide a search result, according to some embodiments. Method 700 may be performed at least partially by any one of the network servers hosting a collection of visual media files (e.g., images, video clips, and multimedia files), while communicating with any one of a plurality of client devices (e.g., servers 130 and clients 110). At least some of the steps in method 700 may be performed by a computer having a processor executing commands stored in a memory of the computer (e.g., processors 212 and 236, memories 220 and 232). For example, at least some of the commands may be included in an application installed in a client device accessible by a user (e.g., application 222). Further, steps as disclosed in method 700 may include retrieving, editing, and/or storing files in a database that is part of, or is communicably coupled to, the computer (e.g., discriminative tool 248, embedded space 250, image database 252, and interaction history database 254). Methods consistent with the present disclosure may include at least some, but not all, of the steps illustrated in method 700, performed in a different sequence. Furthermore, methods consistent with the present disclosure may include at least two or more steps as in method 700 performed overlapping in time, or almost simultaneously.

Step 702 includes receiving an image query from a user via a client device.

Step 704 includes determining a user personalized data based on a prior user history. In some embodiments, step 704 includes identifying a locale information for the user, and generating a synthetic image comprising embedding, with the generative tool, the locale information in an embedded space to classify images from the image database. In some embodiments, step 704 includes training a locale tool to determine a locale information for the user based on the user personalized data, and providing the locale information to the generative tool. In some embodiments, step 704 includes conditioning a locale tool to cluster vectors embedded with a locale information for the user in an embedded space, including a locale information dimension. In some embodiments, step 704 includes training a binary classifier with at least one image, having a likelihood of less than 50% of being selected by the user. In some embodiments, step 704 includes training a locale tool to determine a likelihood that an image will be downloaded by a user of a pre-selected locale.

Step 706 includes generating a synthetic image with a generative tool, based on the image query and the user personalized data. In some embodiments, step 706 includes forming a feature vector with a locale embedding with the user personalized data, and providing the feature vector to the generative tool as a conditional context for generating the synthetic image. In some embodiments, step 706 includes: selecting an image from the image database based on the image query, identifying a centroid of a cluster in embedded space (the cluster associated with a locale information from the user personalized data), and modifying a characteristic of the image according to a line joining a point associated with the image in the embedded space with the centroid of the cluster.

Step 708 includes evaluating a similarity between the synthetic image and a real image in an image database with a discriminative tool. In some embodiments, step 708 includes selecting the real image in the image database to be a closest image to the synthetic image, according to a cosine distance between the synthetic image and the real image in the image database.

Step 710 includes, providing the synthetic image to the user for selection.

Step 712 includes, storing the user response in the prior user history. In some embodiments, step 712 includes providing the user response and the synthetic image to a binary classifier of a user preference, the binary classifier comprising at least one image with a likelihood of less than 50% of being selected by the user.

Figure 8:
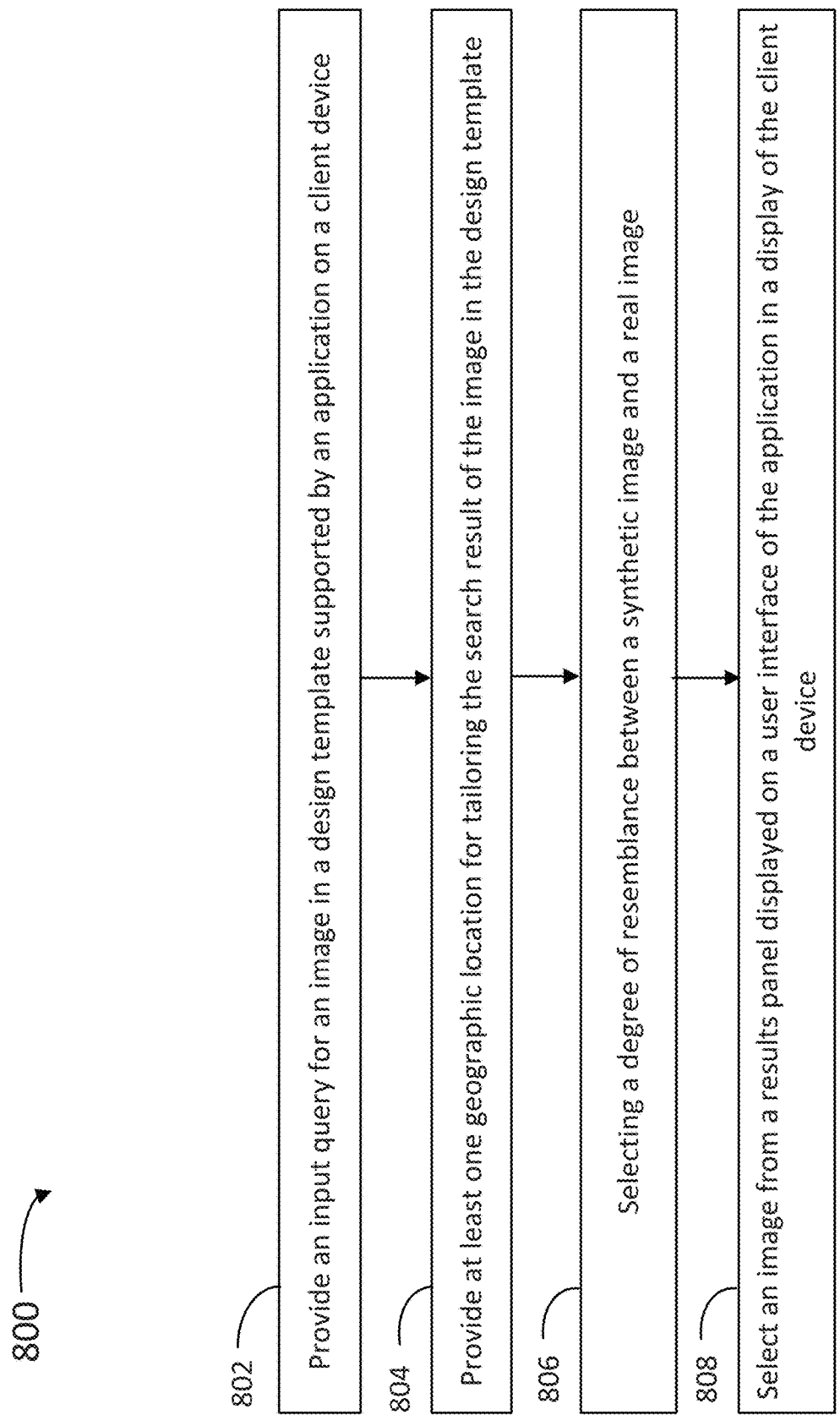
FIG. 8 is a flow chart illustrating steps in a method to create an image based on a selected geographic location via an application on a client device, according to some embodiments.

FIG. 8 is a flow chart illustrating steps in a method 800 to perform a search via an application on a client device. Method 800 may be performed at least partially by any one of the network servers hosting a collection of visual media files (e.g., images, video clips, and multimedia files), while communicating with any one of a plurality of client devices (e.g., servers 130 and clients 110). At least some of the steps in method 800 may be performed by a computer having a processor executing commands stored in a memory of the computer (e.g., processors 212 and 236, memories 220 and 232). For example, at least some of the commands may be included in an application installed in a client device accessible by a user (e.g., application 222). Further, steps as disclosed in method 800 may include retrieving, editing, and/or storing files in a database that is part of, or is communicably coupled to, the computer (e.g., discriminative tool 248, embedded space 250, image database 252, and interaction history database 254). Methods consistent with the present disclosure may include at least some, but not all, of the steps illustrated in method 800, performed in a different sequence. Furthermore, methods consistent with the present disclosure may include at least two or more steps as in method 800 performed overlapping in time, or almost simultaneously.

Step 802 includes providing an input query for an image in a design template supported by the application running on a client device. In some embodiments, step 802 may further include creating a design template using the application in the client device, and requesting one of an audio file, an image file, or a video file to an image search engine, for the design template.

Step 804 includes providing at least one geographic location for tailoring the search result of the image in the design template. In some embodiments, the user may be located in the United States, and interested in creating an advertisement campaign in Southeast Asia. Accordingly, step 804 may include selecting, in a mockup global map in the application, at least one of the countries in Southeast Asia (e.g., Vietnam, Malaysia, Indonesia, etc.) to tailor the advertising campaign to that area. In some embodiments, step 804 includes selecting the at least one geographic location from a list of locations provided by a server based on a prior user history.

Step 806 includes selecting a degree of resemblance between a synthetic image and a real image. In some embodiments, step 806 includes increasing the degree of resemblance when the synthetic image is unrealistic.

Step 808 includes selecting an image from a results panel displayed on a user interface of the application in a display of the client device. In some embodiments, step 806 may include placing the media file (e.g., an image) on the design template. In some embodiments, step 806 may include editing the media file before placing it on the design template. Further, in some embodiments, step 806 may include storing the design template in the memory of the client device, or in the database associated with a search engine that provides the media file.

Hardware Overview

Figure 9:
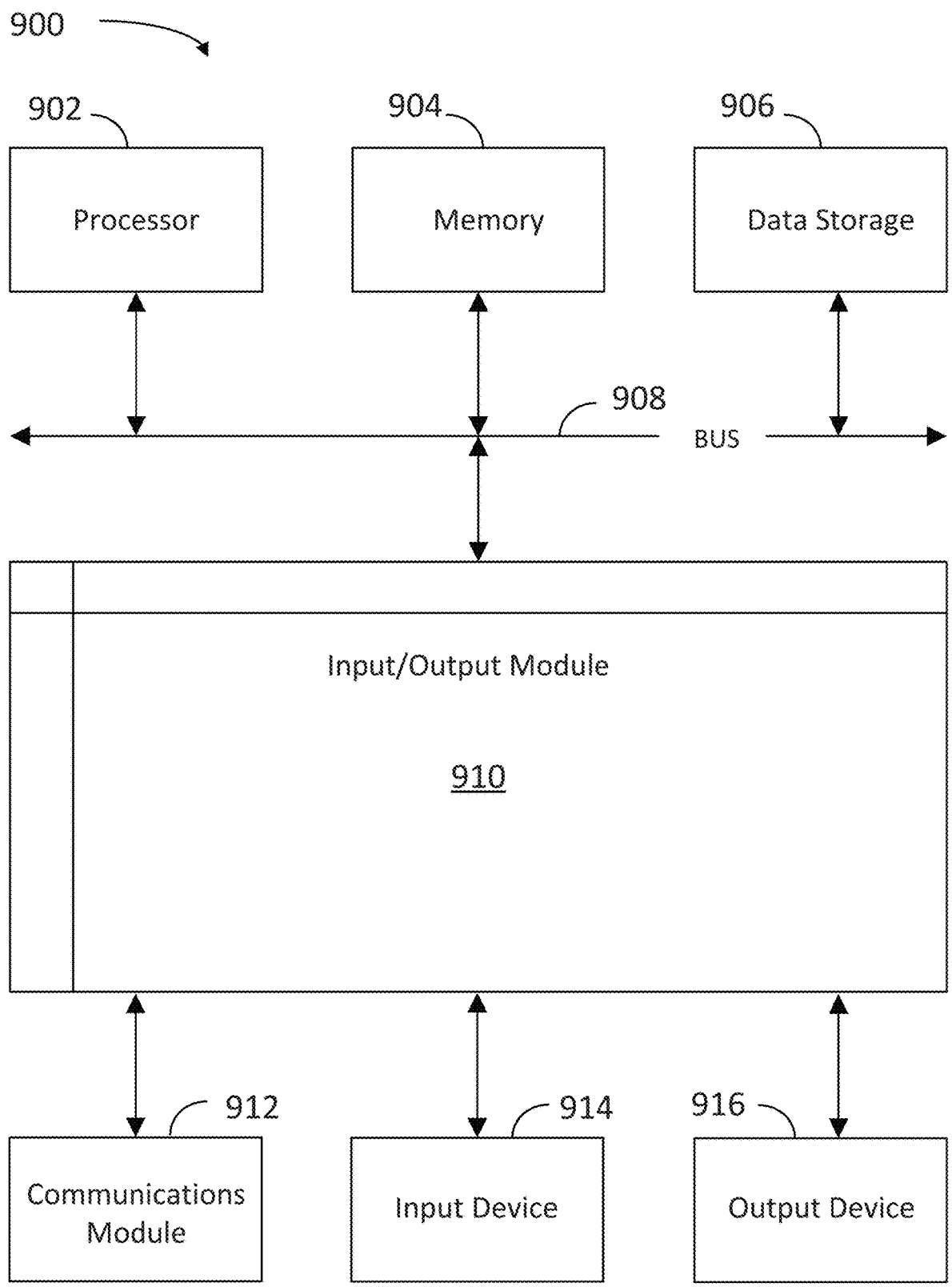
FIG. 9 is a block diagram illustrating an example computer system with which the client and server of FIGS. 1 and 2, and the methods of FIGS. 7 and 8 can be implemented.

FIG. 9 is a block diagram illustrating an exemplary computer system 900 with which the client 110 and server 130 of FIGS. 1 and 2, and the methods of FIGS. 7-8 can be implemented. In certain aspects, the computer system 900 may be implemented using hardware or a combination of software and hardware, either in a dedicated server, or integrated into another entity, or distributed across multiple entities.

Computer system 900 (e.g., client 110 and server 130) includes a bus 908 or other communication mechanism for communicating information, and a processor 902 (e.g., processors 212 and 236) coupled with bus 908 for processing information. By way of example, the computer system 900 may be implemented with one or more processors 902. Processor 902 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 900 can include, in addition to hardware, code that creates an execution environment for the computer program in question, e.g., code that constitutes processor firmware, a protocol stack, a database management system, an operating system, or a combination of one or more of them stored in an included memory 904 (e.g., memories 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 908 for storing information and instructions to be executed by processor 902. The processor 902 and the memory 904 can be supplemented by, or incorporated in, special purpose logic circuitry.

The instructions may be stored in the memory 904 and implemented in one or more computer program products, i.e., one or more modules of computer program instructions encoded on a computer readable medium for execution by, or to control the operation of, the computer system 900, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 904 may also be used for storing temporary variable or other intermediate information during execution of instructions to be executed by processor 902.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 900 further includes a data storage device 906 such as a magnetic disk or optical disk, coupled to bus 908 for storing information and instructions. Computer system 900 may be coupled via input/output module 910 to various devices. Input/output module 910 can be any input/output module. Exemplary input/output modules 910 include data ports such as USB ports. The input/output module 910 is configured to connect to a communications module 912. Exemplary communications modules 912 (e.g., communications modules 218 and 238) include networking interface cards, such as Ethernet cards and modems. In certain aspects, input/output module 910 is configured to connect to a plurality of devices, such as an input device 914 (e.g., input device 214) and/or an output device 916 (e.g., output device 216). Exemplary input devices 914 include a keyboard and a pointing device, e.g., a mouse or a trackball, by which a user can provide input to the computer system 900. Other kinds of input devices 914 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 916 include display devices, such as an LCD (liquid crystal display) monitor, for displaying information to the user.

According to one aspect of the present disclosure, the client 110 and server 130 can be implemented using a computer system 900 in response to processor 902 executing one or more sequences of one or more instructions contained in memory 904. Such instructions may be read into memory 904 from another machine-readable medium, such as data storage device 906. Execution of the sequences of instructions contained in main memory 904 causes processor 902 to perform the process steps described herein. One or more processors in a multi-processing arrangement may also be employed to execute the sequences of instructions contained in memory 904. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 900 can include clients and servers. A client and server are generally remote from each other and typically interact through a communication network. The relationship of client and server arises by virtue of computer programs running on the respective computers and having a client-server relationship to each other. Computer system 900 can be, for example, and without limitation, a desktop computer, laptop computer, or tablet computer. Computer system 900 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 902 for execution. Such a medium may take many forms, including, but not limited to, non-volatile media, volatile media, and transmission media. Non-volatile media include, for example, optical or magnetic disks, such as data storage device 906. Volatile media include dynamic memory, such as memory 904. Transmission media include coaxial cables, copper wire, and fiber optics, including the wires that comprise bus 908. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (e.g, each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:
    receiving an image query from a user via a client device;
    determining a user personalized data based on a prior user history;
    generating a synthetic image with a generative tool, based on the image query and the user personalized data;
    evaluating a similarity between the synthetic image and a real image in an image database with a discriminative tool;
    providing the synthetic image to the user for selection; and
    storing a user response to the synthetic image in the prior user history,
    wherein generating the synthetic image with the generative tool comprises:
        selecting an image from the image database based on the image query,
        identifying a centroid of a cluster in embedded space, the cluster associated with a locale information from the user personalized data, and
        modifying a characteristic of the image according to a line joining a point associated with the image in the embedded space with the centroid of the cluster.

2. The computer-implemented method of claim 1, wherein determining the user personalized data based on the prior user history comprises identifying the locale information for the user, and generating the synthetic image comprises embedding, with the generative tool, the locale information in the embedded space to classify images from the image database.

3. The computer-implemented method of claim 1, wherein determining the user personalized data based on the prior user history comprises training a locale tool to determine the locale information for the user based on the user personalized data, and providing the locale information to the generative tool.

4. The computer-implemented method of claim 1, wherein determining the user personalized data based on the prior user history comprises conditioning a locale tool to cluster vectors embedded with the locale information for the user in the embedded space including a locale information dimension.

5. The computer-implemented method of claim 1, wherein determining the user personalized data based on the prior user history comprises training a binary classifier with at least one image having a likelihood of less than 50% of being selected by the user.

6. The computer-implemented method of claim 1, wherein determining the user personalized data based on the prior user history comprises training a locale tool to determine a likelihood that an image will be downloaded by a user of a pre-selected locale.

7. The computer-implemented method of claim 1, wherein generating the synthetic image with the generative tool comprises forming a feature vector with a locale embedding with the user personalized data, and providing the feature vector to the generative tool as a conditional context for generating the synthetic image.

8. The computer-implemented method of claim 1, further comprising
    conditioning a locale tool to cluster vectors embedded with the locale information for the user in the embedded space including a locale information dimension, wherein the locale information is determined from a client metadata.

9. The computer-implemented method of claim 1, wherein evaluating the similarity between the synthetic image and the real image in the image database comprises selecting the real image in the image database to be a closest image to the synthetic image according to a cosine distance between the synthetic image and the real image in the image database.

10. The computer-implemented method of claim 1, wherein storing the user response to the synthetic image in the prior user history comprises providing the user response and the synthetic image to a binary classifier of a user preference, the binary classifier comprising at least one image with a likelihood of less than 50% of being selected by the user.

11. A system comprising:
a memory, storing instructions; and
at least one processor that executes the instructions to:
- receive an image query from a user via a client device;
- determine a user personalized data based on a prior user history;
- generate a synthetic image with a generative tool, based on the image query and the user personalized data;
- evaluate a similarity between the synthetic image and a real image in an image database with a discriminative tool;
- provide the synthetic image to the user for selection; and
- store a user response to the synthetic image in the prior user history,
- wherein to generate the synthetic image with the generative tool, the at least one processor executes the instructions to:
  - select an image from the image database based on the image query,
  - identify a centroid of a cluster in embedded space, the cluster associated with a locale information from the user personalized data, and
  - modify a characteristic of the image according to a line joining a point associated with the image in the embedded space with the centroid of the cluster.

12. The system of claim 11, wherein to determine the user personalized data based on the prior user history, the one or more processors are configured to identify the locale information for the user, and generating the synthetic image comprises embedding, with the generative tool, the locale information in the embedded space to classify images from the image database.

13. The system of claim 11, wherein to determine the user personalized data based on the prior user history, the one or more processors are configured to train a locale tool to determine the locale information for the user based on the user personalized data, and providing the locale information to the generative tool.

14. The system of claim 11, wherein to determine the user personalized data based on the prior user history, the one or more processors are configured to condition a locale tool to cluster vectors embedded with the locale information for the user in the embedded space including a locale information dimension.

15. The system of claim 11, wherein to determine the user personalized data based on the prior user history, the one or more processors are configured to train a binary classifier with at least one image having a likelihood of less than 50% of being selected by the user.

16. The system of claim 11, wherein to determine the user personalized data based on the prior user history, the one or more processors are configured to train a locale tool to determine a likelihood that an image will be downloaded by a user of a pre-selected locale.

17. The system of claim 11, wherein to generate the synthetic image with the generative tool, the one or more processors are configured to form a feature vector with a locale embedding with the user personalized data, and to provide the feature vector to the generative tool as a conditional context for generating the synthetic image.

* * * * *